(12) United States Patent
Spilker

(10) Patent No.: US 7,353,412 B2
(45) Date of Patent: Apr. 1, 2008

(54) ELECTRICAL CIRCUIT FOR CONTROLLING POWER SUPPLY AND MOTOR VEHICLE BUILT-IN DEVICE BEING OPERABLY CONNECTED TO AN EXTERNAL POWER SUPPLY

(75) Inventor: Jochen Spilker, Munster (DE)

(73) Assignee: Nokia Corporation, Espoo (FI)

( * ) Notice: Subject to any disclaimer, the term of this patent is extended or adjusted under 35 U.S.C. 154(b) by 312 days.

(21) Appl. No.: 10/516,783

(22) PCT Filed: Jun. 27, 2002

(86) PCT No.: PCT/IB02/02449

§ 371 (c)(1),
(2), (4) Date: Jun. 27, 2005

(87) PCT Pub. No.: WO2004/002771

PCT Pub. Date: Jan. 8, 2004

(65) Prior Publication Data

US 2005/0253456 A1   Nov. 17, 2005

(51) Int. Cl.
*G06F 1/32* (2006.01)
(52) U.S. Cl. .................. 713/320; 327/20; 307/10.1
(58) Field of Classification Search .............. 713/320; 327/20; 307/10.1
See application file for complete search history.

(56) References Cited

U.S. PATENT DOCUMENTS

| 5,483,517 | A  |    | 1/1996  | Kurata et al. |
| 5,534,848 | A  |    | 7/1996  | Steele et al. |
| 5,621,250 | A  |    | 4/1997  | Kim |
| 5,729,167 | A  | *  | 3/1998  | Kujawa et al. ............. 327/137 |
| 5,794,055 | A  | *  | 8/1998  | Langer et al. ............. 713/300 |
| 6,144,865 | A  |    | 11/2000 | Pichard |
| 6,469,545 | B2 | *  | 10/2002 | Murr ......................... 327/20 |
| 6,838,783 | B2 | *  | 1/2005  | Stierle et al. ............. 307/10.1 |
| 2002/0097624 | A1 | * | 7/2002 | Andersen et al. ........... 365/222 |
| 2002/0190797 | A1 | * | 12/2002 | Deppe et al. ............... 330/297 |

* cited by examiner

*Primary Examiner*—Chun Cao
*Assistant Examiner*—Vincent T Tran
(74) *Attorney, Agent, or Firm*—Alfred A. Fressola; Ware, Fressola, Van Der Sluys & Adolphson LLP

(57) ABSTRACT

The number of electrical devices implemented in motor vehicles and supplied with electricity by the motor vehicle battery rises with each generation. The manufacturers of motor vehicles make great demands on electrical device to be built-in their motor vehicles, especially to the stand-by power consumption of the built-in devices in order to protect the motor vehicle battery from a fast and undesired unloading during the stop of the motor vehicle. The present invention relates to an electrical circuit provided to be implemented in motor vehicle built-in devices for limiting the power consumption during the stand-by thereof, i.e. to reduce the power consumption to almost no consumption. Further, the present invention relates to an electrical motor vehicle built-in device having the aforementioned electrical circuit for limiting the power consumption of the electrical motor vehicle built-in device.

14 Claims, 3 Drawing Sheets

(state of the art)

ELECTRICAL CIRCUIT FOR CONTROLLING POWER SUPPLY AND MOTOR VEHICLE BUILT-IN DEVICE BEING OPERABLY CONNECTED TO AN EXTERNAL POWER SUPPLY

CROSS REFERENCE TO RELATED APPLICATIONS

This application is for entry into the U.S. national phase under §371 for International Application No. PCT/IB02/002449 having an international filing date of Jun. 27, 2002, and from which priority is claimed under all applicable sections of Title 35 of the United States Code including, but not limited to, Sections 120, 363 and 365(c).

TECHNICAL FIELD

The present invention relates to an electrical circuit for controlling the power supply of an electrical device. More particularly, the present invention relates to the aforementioned circuit for offering a stand-by mode of the electrical device and operable with wake-up signals and sleep signals causing the switching of the power supply.

BACKGROUND OF THE INVENTION

Modern motor vehicles include a large number of electrical devices and electrical units and the number of such electrical devices and units still increases, since buyers of motor vehicle demand these electrical devices and units often in a built-in fashion to provide convenience to the driver of the motor vehicle.

The electrical devices and units built-in a motor vehicle all have to be energized by the power supply of the motor vehicle, typically a battery of limited capacity. The battery of a motor vehicle is charged during operation of the engine of the motor vehicle so that the power consumption of electrical devices and units of the motor vehicle represents no serious problem while the engine is running. But the power consumption of electrical devices and units consuming power from the battery when the engine of the motor vehicle is not running causes a decharging of the battery and hence causes a problem. Especially, electrical devices and units operable in a stand-by operation mode have to be designed in a power saving way. The stand-by operation mode allows for example to activate the device or unit being in the stand-by operation mode via a central control unit of the motor vehicle.

A motor vehicle built-in unit for mobile communication devices is used to couple a mobile communication device such as a mobile phone, a communication handheld and the like, to the further electrical devices and units included in the motor vehicle. The motor vehicle built-in unit allows to couple to an external speaker, e.g. of a car radio, an external microphone, e.g. implemented in the dashboard, to an antenna e.g. having a power amplifier, a remote control e.g. having keys for operating functions of the mobile phone, to the electric circuits of the motor vehicle e.g. via a data communication bus of the motor vehicle for remote operating and the like. Typically such a motor vehicle built-in unit for mobile communication devices is operable with stand-by operation mode to be energizable within different situations.

The manufacturer of motor vehicles impose strict regulations for the requirements to be fulfilled by electrical devices and units to be included in motor vehicles, especially power consumption of electrical devices and units being in a stand-by operation mode is of special interest. The power consumption has to be minimized or has to be below a maximum level or power consumption, in order to ensure that the battery is not drained too much, especially in case the motor vehicle is parked. Certain electrical circuits have been implemented into such devices and units to offer stand-by operation mode. These electrical circuits of the state of the art comprise a large number of active components conventionally requiring to be energized by a voltage regulator.

SUMMARY OF THE INVENTION

The present invention relates to the aspect of providing a power signal from an external power supply, here the battery of the motor vehicle, to an electric device, wherein the power supply is operable with power-up/power-down signals switching on or off the connection of the external power supply to the mobile device, respectively.

The inventive concept relates to an electrical circuit to be implemented into electrical devices energized by external power supplies and to be activated by an external power-on signal operable with a stand-by operation mode. An advantage of the electrical circuit according to an embodiment of the invention is that the electrical circuit does not consume substantial amounts of power. Further, the electrical circuit implements further a voltage level check which prevents damage and faulty operation of the electric device coupled to the electrical circuit by checking if the supplied voltage of the external power supply is within a certain pre-defined voltage level range.

The electrical circuit is designed to be composed of passive components requiring no dedicated power supply (voltage regulator) during the stand-by operation. The electrical circuit comprising passive components is clearly economical and even more reliable during its life-time.

The objects of the invention are attained by an electrical circuit and an apparatus which are characterized by what is claimed in the accompanying independent claims. Further embodiments of the invention are the subject of the corresponding dependent claims.

According to an embodiment of the invention, an electrical circuit for providing an electrical operable connection of an external power supply and an electrical motor vehicle built-in device is provided. The electrical circuit has a main input for coupling to the external power supply, a main output for coupling to the electrical device and a first electrical operable switch interconnected between the main input and the main output. The first electrical operable switch is operable in two switching positions, an open position and a closed position. The first electrical operable switch is conductive in case it is closed and is non-conductive in case it is opened. Further the electrical circuit is provided with at least one wake-up input to receive a wake-up signal and at least one sleep input to receive a sleep signal and the electrical circuit has a bi-stable sub-circuit coupled to the main input and coupled to the first electrical operable switch as well as connected to the at least one wake-up input and to the at least one sleep input The bi-stable circuit is operable such that receiving a wake-up signal results in energizing the bi-stable sub-circuit and receiving a sleep signal results in de-energizing thereof. The energized bi-stable sub-circuit effects to close the first electrical operable switch and the corresponding de-energized bi-stable sub-circuit effects to open the first electrical operable switch.

According to an embodiment of the invention, the bi-stable sub-circuit is embodied by a first transistor and a second transistor. The first transistor has an emitter terminal, a collector terminal and a base terminal and is configured with a bridge resistor interconnected between its emitter terminal and its base terminal and a base resistor connected to its base terminal. The second transistor has an emitter terminal, a collector terminal and a base terminal and is configured with a bridge resistor interconnected between its emitter terminal and its base terminal and a base resistor connected to its base terminal. An interposed resistor having a first and a second terminals is interconnected in-between the first and the second transistor.

The first transistor is coupled via its emitter terminal to the main input, via its collector terminal to a first terminal of the interposed resistor and via its base resistor to the collector terminal of the second transistor. The second transistor is coupled via its emitter to ground, via its base resistor to a second terminal of the interposed resistor and via its collector to the base resistor of the first transistor.

The at least one wake-up input is coupled to a first connection line between the base resistor of the first transistor and the collector terminal of the second transistor, both being coupled. The at least one sleep input is coupled to a second connection line between the base resistor of the second transistor and the second terminal of the interposed resistor, both being coupled. The first electrical operable switch being operable with the bi-stable sub-circuit is coupled to the second connection line.

According to an embodiment of the invention, the electrical circuit further implements a third transistor. The third transistor has analogously an emitter terminal, a collector terminal and a base terminal and is analogously configured with a bridge resistor interconnected between its emitter terminal and its base terminal and a base resistor connected to its base terminal. The third transistor is interconnected in-between a connection line coupling the bi-stable sub-circuit and the first electrical operable switch such that the third transistor is coupled via its base resistor to the second connection line via its collector terminal to the first electrical operable switch and via its emitter terminal to ground.

According to an embodiment of the invention, the electrical circuit further comprises at least one wake-up transistor. Each wake-up transistor has analogously an emitter terminal, a collector terminal and a base terminal and is analogously configured with a bridge resistor interconnected between its emitter terminal and its base terminal and a base resistor connected to its base terminal. The at least one wake-up transistor is interconnected in-between the at least one wake-up input and the bi-stable sub-circuit such that the at least one wake-up transistor is coupled via its base resistor to the at least one wake-up input, via its emitter terminal to ground and via its collector terminal to the first connection line.

According to an embodiment of the invention, the electrical circuit further comprises at least one sleep transistor. Each sleep transistor has analogously an emitter terminal, a collector terminal and a base terminal and is analogously configured with a bridge resistor interconnected between its emitter terminal and its base terminal and a base resistor connected to its base terminal. The at least one sleep transistor is interconnected in-between the at least one sleep input and the bi-stable cub-circuit such that the at least one sleep transistor is coupled via its base resistor to the at least one sleep input, via its emitter terminal to ground and via its collector terminal to the second connection line.

According to an embodiment of the invention, the electrical circuit implements additionally an upper voltage level check circuit. The upper voltage level check circuit comprises a second resistor, a z-diode and a fourth transistor. The fourth transistor has analogously an emitter terminal, a collector terminal and a base terminal and is analogously configured with a bridge resistor interconnected between its emitter terminal and its base terminal and a base resistor connected to its base terminal. The second resistor is coupled to a connection line between the main input and the first electrical operable switch and to a first terminal of the z-diode. The fourth transistor is coupled via its base resistor to a second terminal of the z-diode, via its emitter terminal to ground and via its collector terminal to the second connection line. And the z-diode is adapted to be conductive in case a voltage applied to the main input exceeds a pre-defined upper voltage level.

According to an embodiment of the invention, the electrical circuit further comprises a second electrical operable switch interconnected in-between the first electrical operable switch and the main output and implements additionally an lower voltage level check circuit. The lower voltage level check circuit further comprises a third resistor, a z-diode and a fifth transistor. The fifth transistor has analogously an emitter terminal, a collector terminal and a base terminal and is analogously configured with a bridge resistor interconnected between the emitter terminal and the base terminal and a base resistor connected to its base terminal. The second resistor is coupled to a connection line between the first electrical operable switch and the main output and to a first terminal of the z-diode. The fifth transistor is coupled via its base resistor to a second terminal of the z-diode, via its emitter terminal to ground and via its collector terminal to the second electrical operable switch to be operated. And the z-diode is adapted to be conductive in case a voltage applied to the main input and conducted via the first electrical operable switch being conductive exceeds a pre-defined lower voltage level.

According to an embodiment of the invention, the first electrical operable switch is a metal-oxide field-effect transistor (MOSFET). Alternatively, the first electrical operable switch is a conventional relay.

According to an embodiment of the invention, the second electrical operable switch is a metal-oxide field-effect transistor (MOSFET). Alternatively, the second electrical operable switch is a conventional relay.

According to an embodiment of the invention, the electrical circuit further comprises a third z-diode interconnected between the second terminal of the interposed resistor and the base terminal of the second transistor within the second connection line. The z-diode is adapted to be conductive in case a voltage applied to the main input and conducted via the first transistor being conductive exceeds a pre-defined voltage level.

According to an embodiment of the invention, the motor vehicle built-in device is a free-hand installation main device for detachably connecting a mobile communication device and the external power supply is a battery of a motor vehicle.

According to an embodiment of the invention, a motor vehicle built-in device is provided which is operably connected to an external power supply. The motor vehicle built-in device comprises a plurality of electrical components energized by the external power supply and an electrical circuit for providing an electrical operable connection of an external power supply and the motor vehicle built-in device. The electrical circuit further implements a main input and a main output. The main input is coupled to the external power supply, for example a battery of the motor vehicle including the built-in device. The main output is for example coupled internally to the components of the built-in device to be energized. The first electrical operable switch is operable in two switching positions, an open position and a closed position. The first electrical operable switch is conductive in case it is closed and is non-conductive in case it is open. Further the electrical circuit is provided with at least one wake-up input to receive a wake-up signal and at least one sleep input to receive a sleep signal and the electrical circuit has a bi-stable sub-circuit coupled to the main input and coupled to the first electrical operable switch as well as connected to the at least one wake-up input and to the least one sleep input The bi-stable circuit is operable such that receiving of a wake-up signal results in energizing of the bi-stable sub-circuit and receiving of a sleep signal results in de-energizing thereof. The energized bi-stable sub-circuit effects to close the first electrical operable switch and the corresponding de-energized bi-stable sub-circuit effects to open the first electrical operable switch.

According to an embodiment of the invention, electrical circuit embedded in the motor vehicle built-in device is an electrical circuit according to anyone of the aforementioned embodiments of the electrical circuit with respect to the present invention.

According to an embodiment of the invention, the motor vehicle built-in device is a free hand installation main device for detachably connecting a mobile communication device. Conventionally, such a free-hand installation is mounted permanently in a motor vehicle and provided connectivity to further installations, devices and units included in the motor vehicle. The external power supply is an accumulator of a motor vehicle.

According to an embodiment of the invention, the motor vehicle built-in device embodying a free hand installation main device at least comprises additionally an interface for exchanging signals between electrical units included in the motor vehicle and the motor vehicle built-in device, an interface for exchanging signal between the apparatus and the mobile communication device connected detachably and a control unit to pass signals in-between the interfaces. The exchanged signals comprises at least one wake-up signal and at least one sleep signal.

BRIEF DESCRIPTION OF THE DRAWINGS

The invention will be described in greater detail by the means of preferred embodiments with reference to the accompanying drawings, in which.

DETAILED DESCRIPTION

Figure 1:
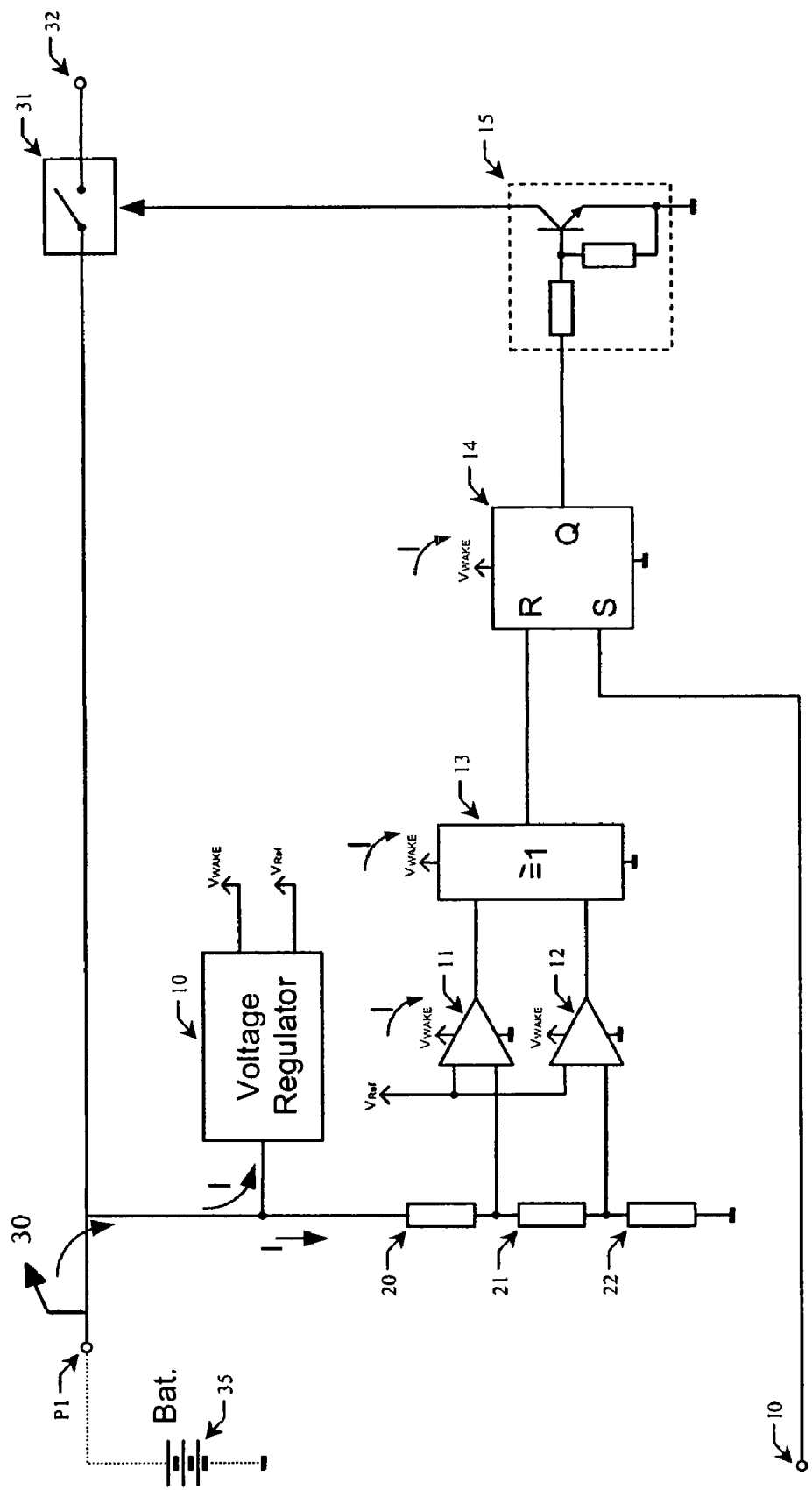
FIG. 1 shows a block diagram illustrating a typical state of the art circuit providing connectivity of an electrical device to an external power supply.

The following description relates to mobile communication devices according to embodiments of the invention. Same or equal parts shown in the figures will be referred to by the same reference numerals.

FIG. 1 illustrates a typical state of the art circuit providing connectivity of an electrical device to an external power supply. The depicted circuit is dedicated to provide connectivity of an electrical device to an external power supply, such as the battery of the motor vehicle, wherein the external power supply can be switched on and switched off using a switching on/off input I0 of the circuit controlling the main switch 31. A power supply input 30 is coupled to the external power supply, here a battery 35 and further the input 30 is coupled to the output 32 via the interconnected main switch 31. The output 32 provides the power to the electrical device.

A voltage regulator 10 connected to the input 30 is employed to generate a first voltage signal $V_{wake}$ and a second voltage signal $V_{ref}$. The first voltage signal $V_{wake}$ is supplied to further components of the circuit to energize them. The second voltage signal $V_{ref}$ is used as a reference voltage signal $V_{ref}$ to be compared with further generated voltage signals as described below.

Resistors 20, 21 and 22 connected in series and coupled to the input 30 to be energized by the external battery 35 are used as a staged voltage divider. A first test voltage is picked up in-between the resistor 20 and the resistor 21, whereas a second test voltage is picked up in-between the resistor 21 and the resistor 22. The first picked up test voltage is supplied to a first operational amplifier 11 operated as comparator to be compared with the reference voltage signal $V_{ref}$, whereas analogously, the second picked up test voltage is supplied to a second operational amplifier 12 operated as comparator to be compared with the reference voltage signal $V_{ref}$. Both the first operational amplifier 11 and the second operational amplifier 12 are energized by the first voltage signal $V_{wake}$ generated by the voltage regulator 10.

The first operational amplifier 11 operated as comparator provides a resulting signal indicating that the operating voltage supplied to the circuit via input 30 is below a certain upper voltage level, whereas the second operational amplifier 12 operated as comparator provides a resulting signal indicating that the operating voltage supplied to the circuit via input 30 is above a certain lower voltage level.

The testing of the voltage level of the external power supply coupled to input 30 ensures that this voltage level of the external power supply is within a certain pre-defined voltage level range, defined by the characteristics of the resistors 20, 21 and 22 as well as the voltage signal $V_{ref}$ generated by the voltage regulator 10. The pre-determined voltage level range is choosen to protect the mobile device, coupled to this circuit, to be energized with a voltage level being too low and with a voltage level being too high which overall results in a protection against damages and miss-operations.

The resulting signals of the operational amplifier 11 and 12 are supplied to inputs of a logical OR component 13. The output of the logical OR component is connected to a reset input R of a RS-flip-flop 14. That is, the RS-flip-flop 14 can only be operated via the set input S in case the voltage level of the external power supply is within the pre-determined voltage level range described above. The set input S of the RS-flip-flop serves as the switching on/off input I0 of the described circuit. In case the RS-flip-flop is in an initial mode in which the output Q of the RS-flip-flop is switched off, a pulse signal supplied to the input S switches the output Q on and a following pulse signal switches the output Q back off, i.e. to the initial mode. The output signal of the output Q of the RS-flip-flop 14 serves to operate the main switch 31 via a transistor 15.

The main disadvantage of the described state of the art circuit is that a couple of active components, i.e. components requiring power, consume power of the battery 35 which is the main power supply of the circuit and the device coupled to output 32. The active components, here voltage regulator 10, operational amplifiers 11 and 12, logical OR component 13 and RS-flip-flop 14, consume power even in case the device coupled to output 32 is switched off via main switch 31. Especially in the case of batteries used as main power supplies coupled to input 30, the reduction of power consumption may be essential since the capacity of such power supplies is limited. Further disadvantages are the complexity of the active components and the costs of them. The complexity may result in a greater number of defects during the expected life time of the circuit which is especially in view of the high costs of the components not efficient.

The following circuit realizes the above presented features of the state of the art circuit while overcoming the disadvantages thereof.

Figure 2:
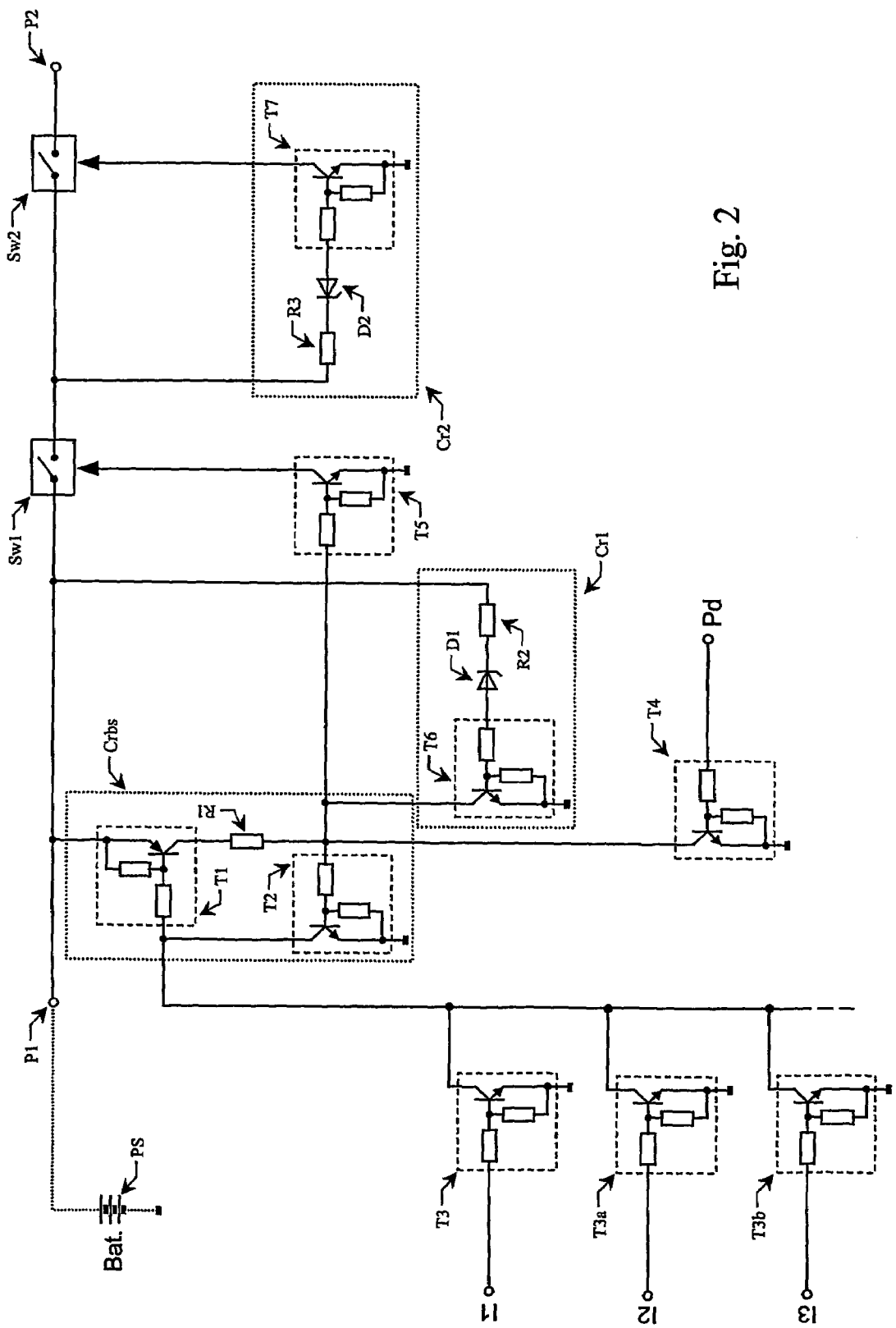
FIG. 2 shows a block diagram illustrating a circuit providing connectivity of an electrical device to an external power supply according to an embodiment of the invention.

FIG. 2 illustrates a circuit providing connectivity of an electrical device to an external power supply according to an embodiment of the invention. The depicted circuit can be embedded in a free-hand installation providing connectivity of an electric device, e.g. mobile device, especially a mobile phone, a mobile communication handheld and further electric mobile devices, to the electronics of a motor vehicle, especially a car. Such a free-hand installation has a mechanical holder or a support for taking a mobile phone and one or several electrical contacts to couple the mobile phone to several electrical units or components of the motor vehicle, respectively, such as a power supply, an ignition, an external antenna, a light, a data bus embedded in the motor vehicle for controlling electrical installations, an on-board multi-functional processing device, a microphone in the interior of the motor vehicle, a car radio and/or the speaker of the car radio. The free-hand installation is energized by the battery of the motor vehicle and is operable with a stand-by operation mode. During the stand-by operation mode the free-hand installation electronic of the motor vehicle is allowed to put the free-hand installation into operation by transmitting a dedicated wake-up signal causing to activate the functionality of the free-hand installation.

The depicted circuit according to an embodiment of the invention has a main input P1 and a main output P2. The main input P1 is coupled to the power supply PS, whereas the output P2 couples the depicted circuit to the electrical device to be energized by the power supply PS. The main switch Sw1 is interconnected in-between the main input P1 and the main output P2 to switch either on or off the power supplied to the main output P2 or the coupled device, respectively. At least one input I1 offers the possibility to feed in a pulse signal causing to close the main switch Sw1. Here, three inputs I1, I2 and I3 can receive pulse signals, each causing to switch on the main switch Sw1. Further at least one input Pd offers the possibility to feed in a pulse signal causing to open the main switch Sw1. An additional embedded circuit Cr1 serves to detect overvoltage and an additional embedded circuit Cr2 serves to detect lowervoltage.

In the following, the components of the circuit and their configuration are described in detail. The circuit is based on passive components, i.e. a plurality of configured transistors, resistors, Z-diodes and electrical operable main switches.

Each of the transistors comprised in the circuit is configured with resistors, i.e. a base terminal of a configured transistor has interconnected a resistor and the emitter terminal of the configured transistor is interconnected to the base via a further resistor. The configuration of the transistors is designed such that the transistors operate as electrical switches. In the following, when the transistors become conductive the conductive state will be termed as switched on, whereas when the transistor is not conductive the non-conductive state will be termed as switched off.

The circuit has two operation states, a power-down state and a power-up state. In the power-down state, which is also the initial circuit state, the main switch Sw1 is opened. In the power-up state the main switch Sw1 is closed, i.e. the main switch is conductive. The detailed operation of the circuit is described in the following in view of a wake-up functionality transferring the power-down state into the power-up state and a sleep functionality transferring the power-up state into the power-down state Wake-up Functionality A wake-up signal is supplied to the wake-up input I1 connected to the base terminal of the configured transistor T3 causing to switch on the configured transistor T3. The wake-up signal can be a pulse signal having a pulse level adapted to switch on the configured transistor T3. The emitter terminal of the configured transistor T3 is coupled to ground of the circuit whereas the collector terminal of the configured transistor T3 is coupled to the base terminal of the configured transistor T1, which in turn is coupled via its emitter terminal to the main input P1 and via its collector terminal through a resistor R1 to the base terminal of configured transistor T2. A configured transistor T2 switched on results in a switching on of the configured transistor T1. The configured transistor T2 is further coupled via its emitter terminal to ground and via its collector terminal to the base terminal of the configured transistor T1 such that the switched on configured transistor T1 results in a switched on transistor T2 which in turn holds the switched on status of the configured transistor T1 even in case no wake-up signal is supplied any more to the input I1.

The configured transistors T1 and T2 are interconnected such that a single wake-up signal supplied via the configured transistor T3 to the interconnection of the base terminal of configured transistor T1 and collector terminal of configured transistor T2 results in transition of a stable switched off status into a stable switched on status of the both configured transistors T1 and T2. The sub-circuit comprising the configured transistors T1 and T2 represents a bi-stable circuit Crbs. A signal picked up from this bi-stable circuit Crbs is used in the following to operate the main switch Sw1. In order to operate the main switch Sw1, the base terminal of the configured transistor T2 is coupled to the base terminal of a further configured transistor T5, of which the emitter terminal is connected to ground and the collector terminal operates the main switch Sw1, i.e. the main switch Sw1 is closed to be conductive. The main switch Sw1 is for example a MOS-FET (metal-oxide semiconductor field-effect transistor), a relay or any other electrical operable switch, in particular providing the possibility to pass though high currents.

Comprehensively, a wake-up signal supplied to wake-up input I1 switches on configured transistor T3, which in turn switches on the configured transistors T1 and T2 as well as additionally the configured transistor T5. The properties of the bi-stable sub-circuit Crbs comprising the configured transistors T1 and T2, respectively, ensures that the configured transistor T1 remains switched on and hence also the configured transistors T2 and T5 even in case the wake-up signal is no longer supplied to configured transistor T3.

The number of wake-up inputs is not limited to the aforementioned wake-up input I1. An unlimited number of wake-up inputs can be included in the presented circuit according to an embodiment of the invention. The FIG. 2 illustrates two further wake-up inputs I2 and I3. Each of the wake-up inputs have a configured transistor, here configured transistor T3a and T3b, respectively, equivalent to the configured transistor T3 and configured analogously. The configured transistor T3a and T3b are connected in parallel to the configured transistor T3, i.e. the wake-up inputs I2 and I3 are coupled to the respective base contacts of the configured transistor T3a and T3b and the collector contacts thereof are coupled to the base terminal of configured transistor T1.

Sleep Functionality

A sleep or power down signal is supplied to the sleep input Pd, respectively, connected to the base terminal of the configured transistor T4 causing to switch on the configured transistor T4. The sleep signal can be a pulse signal having a pulse level adapted to switch on the configured transistor T4. The emitter terminal of the configured transistor T4 is coupled to ground whereas the collector terminal of the configured transistor T4 is coupled to the base terminal of the configured transistor T2 and hence also to the base terminal of the configured transistor T5. The configured transistor T4 switched on causes that the both base contacts of the configured transistors T2 and T5 are tied to ground resulting in switching off of the configured transistors T2 and T5. This results further in opening of the main switch Sw1 in reaction to the configured transistor T5 switched off, i.e. transition of the power-up state of the circuit into the power-down state, and in switching off of configured transistor T1 in reaction to the configured transistor T2 switched off.

The number of sleep inputs is not limited to the aforementioned sleep input Pd. An unlimited number of sleep inputs can be included in the presented circuit according to an embodiment of the invention. The FIG. 2 illustrates only the described sleep input Pd. Further sleep inputs can be realized in that further configured transistors are connected in parallel to the configured transistor T4. These further configured transistors are equivalent to the configured transistor T4 and configured analogously. Each further configured transistor providing further sleep inputs is coupled to the base terminal of the configured transistor T2.

Voltage Level Check

The circuit illustrated in FIG. 2 further includes sub-circuits to ensure that the voltage level of the external power supply PS is within a pre-defined voltage level range ($V_{ZD2}$ to $V_{ZD1}$). In case the voltage level of the external power supply PS exceeds the pre-defined upper voltage level $V_{ZD1}$ of the voltage level range a sub-circuit Cr1 protects an electrical device coupled to the output P2 by opening the main switch Sw1. In case the voltage level of the external power supply PS falls below the pre-defined lower voltage level $V_{ZD2}$ a sub-circuit Cr2 protects an electrical device coupled to the output P2 by opening a main switch Sw2 connected in series to the main switch Sw1 and interconnected in-between main switch Sw1 and output P2.

Upper Voltage Level Check

The sub-circuit Cr1 comprises a configured transistor T6, a z-diode D1 and a resistor R2 both connected in series to the base terminal of the configured transistor T6, wherein the z-diode D1 is interposed between base terminal and resistor R2. In turn, the resistor R2 is further coupled to the input P1, whereas the collector terminal of the configured transistor T6 is coupled to the base terminal of configured transistor T2 and the base terminal of configured transistor T5, respectively. The z-diode D1 is interposed such that in case of the voltage level applied to the input P1 by the external power supply PS exceeds a pre-defined voltage level, this is the upper voltage level $V_{ZD1}$, the z-diode D1 becomes conductive and the configured transistor T6 is switched on which causes to ground the base terminal of the configured transistor T2 and the base terminal of the configured transistor T5, respectively, (in analogy to a sleep signal supplied to the sleep input Pd). The switching off of configured transistor T2 causes also to switch off the configured transistor T1. The upper voltage level $V_{ZD1}$ is determined by the characteristics of the z-diode D1.

Once the pre-defined upper voltage level $V_{ZD2}$, is detected to be exceeded the circuit is set into the power-down state. The circuit being again in the power-up state can be accomplished by supplying a wake-up signal to one of the implemented wake-up inputs (here, inputs I1, I2 and I3). In case of overvoltage detection the wake-up functionality is disabled.

Lower Voltage Level Check

The sub-circuit Cr2 comprises a configured transistor T7, a z-diode D2 and a resistor R3 both connected in series to the base terminal of the configured transistor T7, wherein the z-diode D2 is interposed between base terminal and resistor R3. In turn, the resistor R3 is further coupled to an interconnection of the main switch Sw1 and the main switch Sw2, whereas the signal of the collector terminal of the configured transistor T7 is supplied to the main switch Sw2 for operating this. The z-diode D2 is interposed such that in case of the voltage level applied to the input P1 by the external power supply PS and conducted through a closed main switch Sw2 exceeds a pre-defined voltage level, this is the lower voltage level $V_{ZD2}$, the z-diode D2 becomes conductive and the configured transistor T7 is switched on which causes to close the main switch Sw2 such that power is conducted from the input P1 through the main switch Sw1 and main switch Sw2 to the output P2. In case the voltage level applied to the z-diode D2 falls below the lower voltage level $V_{ZD2}$ the configured transistor T7 is switched off and hence the main switch Sw2 is opened causing the interruption of the connection between input P1 and input P2. The lower voltage level $V_{ZD2}$ is determined by the characteristics of the z-diode D2. The sub-circuit Cr2 operates independently from the circuit described above.

Memory Functionality

The voltage level range for example is 6.5 V to 16 V, i.e. the lower voltage level $V_{ZD2}$=6.5 V and the upper voltage level $V_{ZD2}$=16 V. Further the components of the presented circuit for example are operable at a minimum voltage level of about 2 V. This means, that the main switch Sw1 is already operable with applied wake-up and sleep signals to the respective inputs in case the external power supply PS supplies a voltage level above this minimum voltage level and the main switch Sw1 can be closed. Since the lower voltage check sub-circuit Cr2 closes the main switch Sw2 only in case the voltage level of the external power supply 35 supplied to the circuit input P1 exceeds the lower voltage level $V_{ZD2}$ no current is fed to output P2. Since further the sub-circuit Cr2 is operated independently the main switch Sw2 is closed in the moment a sufficient voltage level is supplied to input P1 by the external power supply 35. A power-up state is preserved even if the voltage level of the external power supply 35 is below the pre-defined voltage level range.

According to another embodiment of the invention, this memory effect can be prevented by interconnecting an additional z-diode in-between resistor R1 and the configured transistor T2, i.e. in-between resistor R1 and common connecting point of the configured transistors T2, T4, T5 and T6, respectively. Therefore, the additional z-diode is adapted to the lower voltage level $V_{ZD2}$, i.e. its characteristics are adapted to the lower voltage level $V_{ZD2}$, preventing the switching of the configured transistor T2 at a voltage level of the external power supply PS below the lower voltage level $V_{ZD2}$.

The comparison of the state of the art circuit presented in FIG. 1 and the circuit according to an embodiment of the invention presented in FIG. 2 shows clearly the aforementioned advantages of the circuit in accordance with the invention concept. In case of the power-down state of the inventive circuit shown in FIG. 2 no power is consumed by the circuit, especially when parasitic effects of the components have not to be taken into account. Even when parasitic effects are considered a current consumption in the range of a few micro amperes is achievable. The parasitic effects can be kept under control by selecting the used and installed components. All components are passive components which have to be energized only during the power-up state of the circuit. Additionally, the functionality of the circuit is realized by a small number of single components which reduces dramatically the costs and improves the reliability of the circuit especially in view of a long life-term.

The number of wake-up inputs as well as the number of sleep inputs can be fitted easily to the respective requirements by connecting configured transistors in parallel to the corresponding configured transistors implemented therefor.

Figure 3:
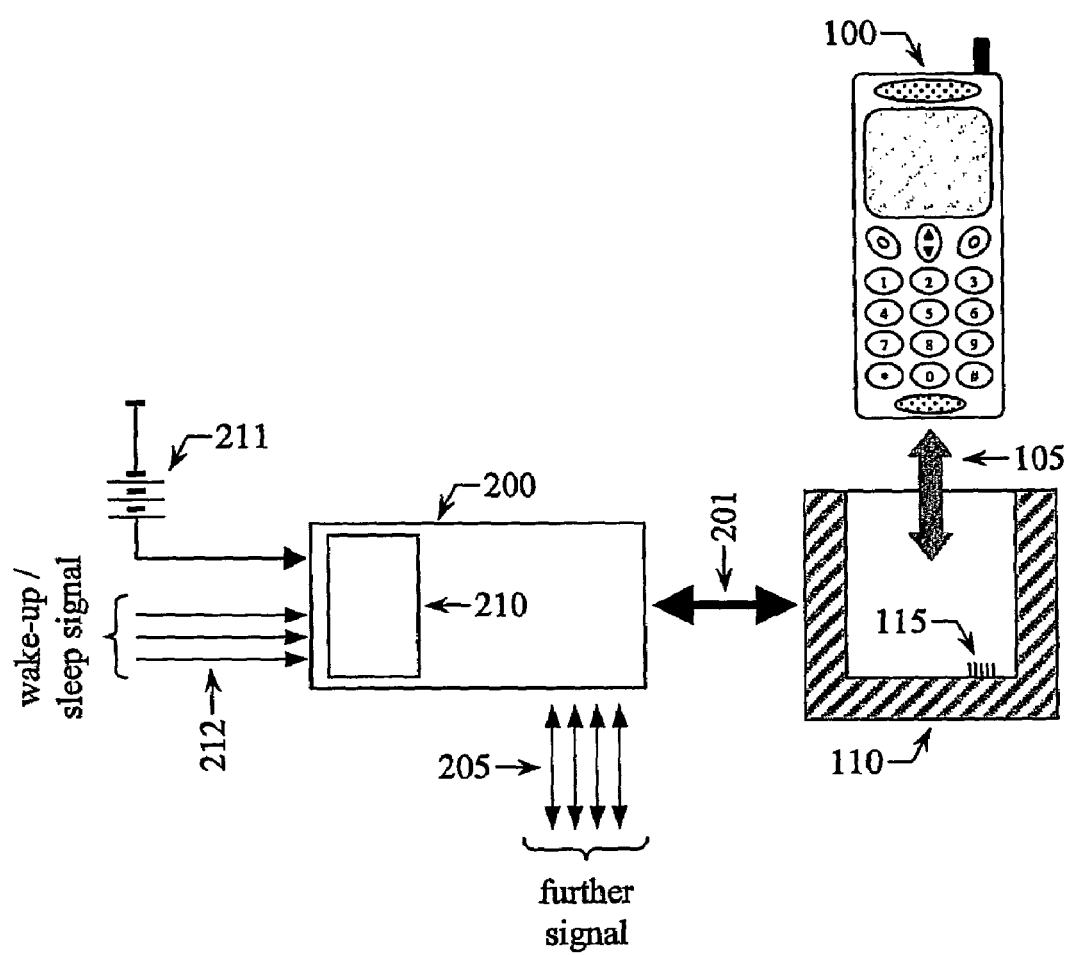
FIG. 3 shows a block diagram illustrating a junction box of a hand-free installation according to an embodiment of the invention.

FIG. 3 illustrates a junction box of a hand-free installation according to an embodiment of the invention. The junction box at least implements a circuit according to an embodiment of the invention, for example the circuit depicted in FIG. 2. The junction box 200 provides the connectivity of a holder of a mobile device such as a mobile phone 100 depicted to an external power supply 211 and further electronic devices. Especially, wake-up and sleep signals 212 are supplied to the junction box 200. The junction box includes at least an aforementioned electric circuit 210 according to an embodiment of the invention. The power supply connection is coupled to the circuit 210 and the wake-up and sleep signals are applied to the respective inputs. The wake-up signals and/or the sleep signals can be provided via a data bus system to which one or several interfaces are coupled generating such signal in accordance with data information transmitted via the data bus. The wake-up signal can also be obtained from the holder, eg a wake-up signal is supplied to the junction box upon insertion of the mobile device into the holder.

During the stand-by operation mode of the junction box 200 the implemented electrical circuit 210 according to an embodiment of the invention causes to be operable with receiving of a wake-up signal via one of the implemented wake-up inputs while further electrical units and circuits implemented in the junction box providing the functionality of the junction box are separated from the power supply such that these further electrical units and circuits are not able to consume power of the external power supply. The wake-up inputs of the electrical circuit 210 but also the sleep inputs thereof can be adapted to different kind of wake-up and sleep signals, respectively, e.g. different signal levels, signals having a different duration of time etc.

The junction box may implement further circuits or interfaces, respectively, necessary to connect the mobile device 100 to further electric, such as an ignition, an external antenna, a light, a data bus embedded in the motor vehicle for controlling electrical installations, an on-board multifunctional processing device, a microphone in the interior of the motor vehicle, a car radio and/or the speaker of the car radio.

A multi-wired cable 201 connects the junction box to a holder 110 of the mobile phone 100. The connecting cable 201 may include at least a power line coupled to the output of the circuit 210 which is energized in accordance with the wake-up and sleep signals supplied to the circuit 210. The holder 110 takes detachably the mobile phone 100, wherein the holder 110 has at least a multiple plug connector which connects holder 110 with the mobile phone 100

The present invention has been described in view of a hand-free installation for mobile communication device. It is to be understood that the problem which is overcome by the inventive concept also relates to a broad number of different electrical devices and the presented solutions in the way of embodiments of the electrical circuit can be implemented in these different electrical devices.

While the invention has been particularly shown and described with respect to embodiments as examples, it will be understood by those skilled in this area of technology that changes in form and details my be made therein, including in the form of other embodiments, without departing from the scope and spirit of the invention, which is defined by the appended claims.

What is claimed is:

1. An electrical circuit comprising:
a main input for coupling to an external power supply;
a main output for coupling to an electrical device; and
a first electrical operable switch interconnected between said main input and said main output, said first electrical operable switch having an open position and a closed position, said first electrical operable switch being conductive in said closed position and being non-conductive in said open position;
at least one wake-up input to receive a wake-up signal;
at least one sleep input to receive a sleep signal; and
a bi-stable sub-circuit coupled to said main input and coupled to said first electrical operable switch, said sub-circuit being connected to said at least one wake-up input and to said least one sleep input such that
a received wake-up signal energizes said bi-stable sub-circuit and a received sleep signal de-energizes said bi-stable sub-circuit; wherein said energized bi-stable sub-circuit causes said first electrical operable switch to close and said de-energized bi-stable sub-circuit causes said first electrical operable switch to open;
wherein said bi-stable sub-circuit comprises:
a first transistor having an emitter terminal, a collector terminal and a base terminal, wherein said first transistor is configured with a bridge resistor interconnected between its emitter terminal and its base terminal and a base resistor connected to its base terminal;
a second transistor having an emitter terminal, a collector terminal and a base terminal, wherein said second transistor is configured with a bridge resistor interconnected between its emitter terminal and its base terminal and a base resistor connected to its base terminal; and an interposed resistor;
wherein said first transistor is coupled via its emitter terminal to said main input, via its collector terminal to a first terminal of said interposed resistor and via its base resistor to said collector terminal of said second transistor;
wherein said second transistor is coupled via its emitter to ground, via its base resistor to a second terminal of said interposed resistor and via its collector to said base resistor of said first transistor;
wherein said at least one wake-up input is coupled to a first connection line between said base resistor of said first transistor and said collector terminal of said second transistor, both being coupled;
wherein said at least one sleep input is coupled to a second connection line between said base resistor of said second transistor and said second terminal of said interposed resistor, both being coupled; and
wherein said first electrical operable switch is operable with said bi-stable sub-circuit being coupled to said second connection line.

2. The electrical circuit according to claim 1, further comprising:
a third transistor having an emitter terminal, a collector terminal and a base terminal, wherein said third transistor is configured with a bridge resistor interconnected between its emitter terminal and its base terminal and a base resistor connected to its base terminal;
wherein said third transistor is interconnected in-between a connection line coupling said bi-stable sub-circuit and said first electrical operable switch such that said third transistor is coupled via its base resistor to said second connection line via its collector terminal to said first electrical operable switch and via its emitter terminal to ground.

3. The electrical circuit according to claim 1, further comprising:
at least one wake-up transistor having an emitter terminal, a collector terminal and a base terminal, wherein said at least one wake-up transistor is configured with a bridge resistor interconnected between its emitter terminal and said its terminal and a base resistor connected to its base terminal;
wherein said at least one wake-up transistor is interconnected in-between said at least one wake-up input and said bi-stable cub-circuit such that said at least one wake-up transistor is coupled via its base resistor to said at least one wake-up input, via its emitter terminal to ground and via its collector terminal to said first connection line.

4. The electrical circuit according to claim 1, further comprising:
at least one sleep transistor having an emitter terminal, a collector terminal and a base terminal, wherein said at least one sleep transistor is configured with a bridge resistor interconnected between its emitter terminal and its base terminal and a base resistor connected to its base terminal;
wherein said at least one sleep transistor is interconnected in-between said at least one sleep input and said bi-stable sub-circuit such that said at least one sleep transistor is coupled via its base resistor to said at least one sleep input, via its emitter terminal to ground and via its collector terminal to said second connection line.

5. The electrical circuit according to claim 1, further comprising:

an upper voltage level check circuit comprising:
a second resistor;
a z-diode; and
a fourth transistor having an emitter terminal, a collector terminal and a base terminal, wherein said fourth transistor is configured with a bridge resistor interconnected between its emitter terminal and its base terminal and a base resistor connected to its base terminal;
wherein said second resistor is coupled to a connection line between said main input and said first electrical operable switch and to a first terminal of said z-diode;
wherein said fourth transistor is coupled via its base resistor to a second terminal of said z-diode, via its emitter terminal to ground and via its collector terminal to said second connection line; and
wherein said z-diode is adapted to be conductive in case a voltage applied to said main input exceeds a pre-defined upper voltage level.

6. The electrical circuit according to claim 1, further comprising:
a second electrical operable switch interconnected in-between said first electrical operable switch and said main output; and
an lower voltage level check circuit comprising
a third resistor;
a z-diode; and
a fifth transistor having an emitter terminal, a collector terminal and a base terminal, wherein said fifth transistor is configured with a bridge resistor interconnected between said emitter terminal and said base terminal and a base resistor connected to its base terminal;
wherein said second resistor is coupled to a connection line between said first electrical operable switch and said main output and to a first terminal of said z-diode;
wherein said fifth transistor is coupled via its base resistor to a second terminal of said z-diode, via its emitter terminal to ground and via its collector terminal to said second electrical operable switch to be operated; and
wherein said z-diode is adapted to be conductive in case a voltage applied to said main input and conducted via said first electrical operable switch being conductive exceeds a pre-defined lower voltage level.

7. The electrical circuit according to claim 1, wherein said first electrical operable switch is a metal-oxide field-effect transistor.

8. The electrical circuit according to claim 6, wherein said second electrical operable switch is a metal-oxide field-effect transistor.

9. The electrical circuit according to claim 1, further comprising:
a third z-diode interconnected between said second terminal of said interposed resistor and said base terminal of said second transistor within said second connection line;
wherein said z-diode is adapted to be conductive in case a voltage applied to said main input and conducted via said first transistor being conductive exceeds a pre-defined voltage level.

10. The electrical circuit according to claim 1, wherein said electrical device is a free-hand installation main device for detachably connecting a mobile communication device and said external power supply is a battery of a motor vehicle.

11. A motor vehicle built-in device comprising:
a plurality of electrical components energized by an external power supply; and an electrical circuit for providing an electrical operable connection of said external power supply and said motor vehicle built-in device, wherein said electrical circuit comprises:

a main input for coupling to said external power supply;

a main output for coupling to said motor vehicle built-in device;

a first electrical operable switch interconnected between said main input and said main output, said first electrical operable switch having an open position and a closed position, said first electrical operable switch being conductive in said closed position and being non-conductive in said open position;

at least one wake-up input to receive a wake-up signal;

at least one sleep input to receive a sleep signal; and a bi-stable sub-circuit coupled to said main input and coupled to said first electrical operable switch, said sub-circuit being connected to said at least one wake-up input and to said least one sleep input such that
 a received wake-up signal energizes said bi-stable sub-circuit and a received sleep signal de-energizes said bi-stable sub-circuit; wherein said energized bi-stable sub-circuit causes said first electrical operable switch to close and said de-energized bi-stable sub-circuit causes said first electrical operable switch to open;

wherein said bi-stable sub-circuit comprises:

a first transistor having an emitter terminal, a collector terminal and a base terminal, wherein said first transistor is configured with a bridge resistor interconnected between its emitter terminal and its base terminal and a base resistor connected to its base terminal;

a second transistor having an emitter terminal, a collector terminal and a base terminal, wherein said second transistor is configured with a bridge resistor interconnected between its emitter terminal and its base terminal and a base resistor connected to its base terminal; and an interposed resistor;

wherein said first transistor is coupled via its emitter terminal to said main input, via its collector terminal to a first terminal of said interposed resistor and via its base resistor to said collector terminal of said second transistor;

wherein said second transistor is coupled via its emitter to ground, via its base resistor to a second terminal of said interposed resistor and via its collector to said base resistor of said first transistor;

wherein said at least one wake-up input is coupled to a first connection line between said base resistor of said first transistor and said collector terminal of said second transistor, both being coupled;

wherein said at least one sleep input is coupled to a second connection line between said base resistor of said second transistor and said second terminal of said interposed resistor, both being coupled; and wherein said first electrical operable switch is operable with said bi-stable sub-circuit being coupled to said second connection line.

12. The motor vehicle built-in device according to claim 11, wherein said motor vehicle built-in device is a free hand installation main device for detachably connecting a mobile communication device and said external power supply is a battery of a motor vehicle.

13. The motor vehicle built-in device according to claim 12, further comprising:

at least one interface for exchanging signals between electrical units included in said motor vehicle and said motor vehicle built-in device, said signals comprising said at least one wake-up signal and said at least one sleep signal;

at least one interface for exchanging a signal between said motor vehicle built-in device and said mobile communication device connected detachably; and at least one control unit to pass signals in-between said interfaces.

14. An electrical circuit comprising:

means for coupling to an external power supply;

means for coupling to an electrical device; and means for providing a first electrical operable switch interconnected between said means for coupling to an external power supply and said means for coupling to an electrical device, said first electrical operable switch having an open position and a closed position, said first electrical operable switch being conductive in said closed position and being non-conductive in said open position;

means for receiving a wake-up signal;

means for receiving a sleep signal; and means for providing a bi-stable sub-circuit coupled to said means for coupling to an external power supply and coupled to said first electrical operable switch, said sub-circuit being connected to said means for receiving a wake-up signal and to said means for receiving a sleep signal such that a received wake-up signal energizes said bi-stable sub-circuit and a received sleep signal de-energizes said bi-stable sub-circuit; wherein said energized bi-stable sub-circuit causes said first electrical operable switch to close and said de-energized bi-stable sub-circuit causes said first electrical operable switch to open;

wherein said bi-stable sub-circuit comprises:

a first transistor having an emitter terminal, a collector terminal and a base terminal, wherein said first transistor is configured with a bridge resistor interconnected between its emitter terminal and its base terminal and a base resistor connected to its base terminal;

a second transistor having an emitter terminal, a collector terminal and a base terminal, wherein said second transistor is configured with a bridge resistor interconnected between its emitter terminal and its base terminal and a base resistor connected to its base terminal; and an interposed resistor;

wherein said first transistor is coupled via its emitter terminal to said means for coupling to an external power supply, via its collector terminal to a first terminal of said interposed resistor and via its base resistor to said collector terminal of said second transistor;

wherein said second transistor is coupled via its emitter to ground, via its base resistor to a second terminal of said interposed resistor and via its collector to said base resistor of said first transistor;

wherein said means for receiving a wake-up signal is coupled to a first connection line between said base resistor of said first transistor and said collector terminal of said second transistor, both being coupled;

wherein said means for receiving a sleep signal is coupled to a second connection line between said base resistor of said second transistor and said second terminal of said interposed resistor, both being coupled; and wherein said first electrical operable switch is operable with said bi-stable sub-circuit being coupled to said second connection line.

* * * * *

UNITED STATES PATENT AND TRADEMARK OFFICE
CERTIFICATE OF CORRECTION

PATENT NO.       : 7,353,412 B2                                         Page 1 of 1
APPLICATION NO.  : 10/516783
DATED            : April 1, 2008
INVENTOR(S)      : Spilker It is certified that error appears in the above-identified patent and that said Letters Patent is hereby corrected as shown below:

At column 13, line 47, claim 3, line 11, please remove the word "cub-circuit" and replace with --sub-circuit--.

Signed and Sealed this

Eighth Day of July, 2008

JON W. DUDAS
*Director of the United States Patent and Trademark Office*